Nov. 1, 1932.  J. H. APP  1,885,669
ATTACHMENT FOR HEATING WATER
Filed Dec. 20, 1930
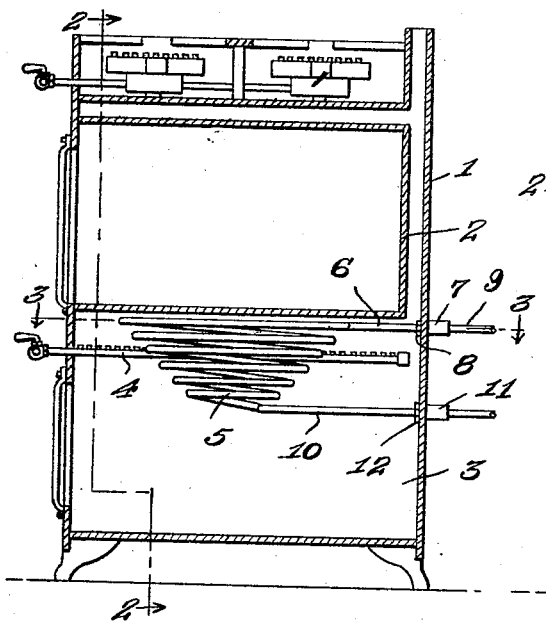
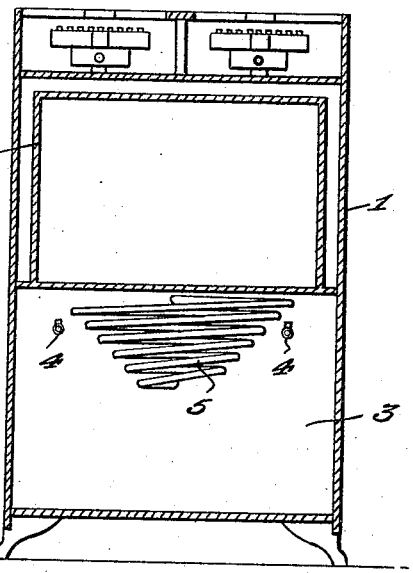
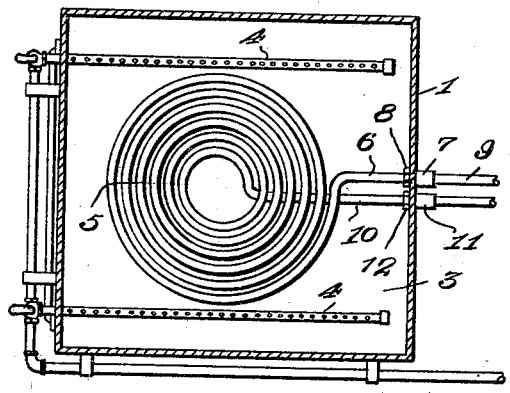
John H. App,
INVENTOR
BY Victor J. Evans
and A. L. Evans
ATTORNEYS Patented Nov. 1, 1932

1,885,669

UNITED STATES PATENT OFFICE

JOHN H. APP, OF MEDFORD, MASSACHUSETTS

ATTACHMENT FOR HEATING WATER

Application filed December 20, 1930. Serial No. 503,841.

The object of this, my present invention, is the provision of a means for utilizing the heat from the broiler and oven heating burners of a gas stove for heating water.

A further object is to provide a water heating attachment for gas stoves in the nature of a copper coil wound to provide the same with a single volute helix, the coils of which being closely related and the upper and widened coil having a straight branch that provides a water outlet, the lower and narrow coil being provided with a single branch that provides the water inlet, both of the branches directed through the rear of the stove and being self-supporting without the stove so that the center of the coil is arranged approximately in a line with the broiler or lower oven of the stove and the upper coil is disposed in close proximity to the bottom of the baking oven to receive heat therefrom as well as from the burners and whereby water permitted to circulate through the coil will be heated in an expeditious manner as long as the oven is in use or the burners lighted.

To the attainment of the foregoing the invention consists in the improvement hereinafter described and definitely claimed.

In the drawing:

Figure 1 is an approximately central vertical transverse sectional view through an ordinary gas stove equipped with the improvement.

Figure 2 is a sectional view approximately on the line 2—2 of Figure 1.

Figure 3 is a horizontal sectional view approximately on the line 3—3 of Figure 1.

In the drawing the numeral 1 designates a gas range or stove of the ordinary construction, the same being provided below its upper burners with a baking oven 2 and below the baking oven with a broiler compartment 3.

The burners 4 which are arranged in the broiler and from which both the broiler and the baking oven are heated are in the present instance in the nature of straight pipes which are apertured, the apertures being surrounded by teats or flanges, the rear ends of the burner pipes 4 being closed and the front ends thereof being connected to the gas manifold.

As disclosed by the drawing my improvement comprises a copper coil 5 wound to provide a single volute helix. The coils are closely related so that a comparatively large quantity of water is forced through the coils and subjected to the heat from the burners 4, the heat from the broiler oven 3 and the heat that is deflected from the bottom of the baking oven 2. The upper and widened coil of the water circulating device is arranged in close proximity to the bottom of the baking oven 2 and is provided with a straight extension 6 that is directed through the rear of the oven. The extension 6 has screwed thereon a coupling member 7 and if desired the said extension 6 may have threaded thereon a nut 8. The nut 8 contacts with the inner wall of the back of the stove 1, the coupling with the outer wall and the coupling 7 is connected with a pipe 9. While not disclosed by the drawing the pipe 9 has its passage controlled by a suitable faucet which is screwed on the outer end thereof and the pipe 9 may lead to any desired place where hot water is required or desired. The lower and smallest coil of the water circulating member 5 is also provided with a straight branch 10 that leads through the back of the oven. The branch 10 has screwed on its end a coupling 11 that contacts with the outer face of the rear wall of the stove 1 and may likewise have screwed thereon a nut 12 that contacts with the inner face of the said rear wall of the stove. To the coupling 11 there is connected a pipe that leads from the water supply.

The means for utilizing the heat from the burners of a gas stove for quickly heating water directed through a coil is of an extremely simple nature, and one which may be cheaply constructed and readily positioned in a gas stove. The coil, when in operative position, is self-supporting and as the coil 5 is closely wound a large quantity of water will circulate therethrough before finding an outlet passage through the pipe 9. As previously stated, the coil is heated not only from the burners 4 but from the deflected heat which contacts with the bottom of the oven 2 and likewise by the heat that accumulates in the broiler oven 3.

Having described the invention, I claim:

A stove comprising a body, an oven located therein and disposed in spaced relation above the bottom thereof, a coil located in the body and disposed in the space between the bottom of the body and the bottom of the oven, water inlet and outlet pipes passing through the side of the body and connected with the ends of the coil, burners passing through the side of the body and disposed one at each side of the coil and located under the oven, said burners being disposed at a level lying between the levels of the inlet and outlet pipes.

In testimony whereof I affix my signature.

JOHN H. APP.